United States Patent
Kim et al.

(10) Patent No.: US 12,483,669 B2
(45) Date of Patent: Nov. 25, 2025

(54) DE-WARPING PRE-RECORDED VIDEO AND TRACKING PAN, TILT, AND/OR ZOOM (PTZ) CHANGES TO GENERATE A PTZ-MODIFIED VIDEO

(71) Applicant: Verkada Inc., San Mateo, CA (US)

(72) Inventors: Nayeon Kim, San Mateo, CA (US); Randal Michnovicz, San Francisco, CA (US); Pushpak Pujari, San Mateo, CA (US); Luyao Zhang, Hayward, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/638,479

(22) Filed: Apr. 17, 2024

(65) Prior Publication Data
US 2025/0330551 A1 Oct. 23, 2025

(51) Int. Cl.
  *G11B 27/10* (2006.01)
  *G06T 5/80* (2024.01)
  *G11B 27/036* (2006.01)
  *H04N 5/262* (2006.01)

(52) U.S. Cl.
  CPC ............ *H04N 5/2628* (2013.01); *G06T 5/80* (2024.01); *G11B 27/036* (2013.01); *G11B 27/10* (2013.01); *G06T 2200/24* (2013.01); *G06T 2207/10016* (2013.01)

(58) Field of Classification Search
CPC ..... H04N 5/2628; G06T 5/80; G06T 2200/24; G06T 2207/10016; G11B 27/036; G11B 27/10
See application file for complete search history.

(56) References Cited

U.S. PATENT DOCUMENTS

| RE36,207 E | 5/1999 | Zimmermann et al. |
|---|---|---|
| 9,824,723 B1 | 11/2017 | Bentley et al. |
| 2016/0325680 A1 | 11/2016 | Curtis et al. |
| 2018/0132011 A1* | 5/2018 | Shichman ............ H04N 21/233 |
| 2018/0227607 A1 | 8/2018 | Kang et al. |
| 2021/0099690 A1 | 4/2021 | Jayaram et al. |

(Continued)

OTHER PUBLICATIONS

Author Unknown, "Dewarped views," Axis Communications, first publication date unknown [online], published at: https://www.axis.com/vapix-library/subjects/t10175981/section/t10011928/display on Feb. 26, 2024, 11 pages.

(Continued)

*Primary Examiner* — Thai Q Tran
*Assistant Examiner* — Jose M Mesa
(74) *Attorney, Agent, or Firm* — COOLEY LLP

(57) ABSTRACT

A set of PTZ values associated with a video and a set of timestamps associated with the video are received. The set of PTZ values is generated (1) after a first command from a user to start recording PTZ changes, (2) before a second command from the user to stop recording the PTZ changes, and (3) based on sampling PTZ actions taken by the user, relative to the video, after the first command, and before the second command. Each PTZ value from the set of PTZ values has an associated timestamp from the set of timestamps that indicates a portion of the video from which that PTZ value was sampled. A modified video is generated based on the set of PTZ values and the set of timestamps.

20 Claims, 6 Drawing Sheets

(56) References Cited

U.S. PATENT DOCUMENTS

| | | | | |
|---|---|---|---|---|
| 2021/0314665 A1* | 10/2021 | Davenport | ......... | H04N 21/2743 |
| 2023/0328366 A1* | 10/2023 | Nakayari | ............. | H04N 23/695 |

OTHER PUBLICATIONS

Author Unknown, "GoPro FX Reframe," GoPro, Inc., published Dec. 5, 2023 at https://community.gopro.com/s/article/GoPro-FX-Reframe?language=en_US, 2 pages.

Author Unknown, "MEGApix PTZ: Capture All the Action," Digital Watchdog, Inc., first publication date unknown [online], published at: https://digital-watchdog.com/page/MEGApix_PTZ/ on Feb. 26, 2024, 16 pages.

Author Unknown, "Pelco: PTZ IP Cameras," Genetec, Inc., first publication date unknown [online], published at: https://www.genetec.com/partners/partner-integration-hub/pelco/ptz-ip-cameras#:~:text=Pelco's%20Spectra%C2%AE%20PTZ%20(pan,all%20lighting%20and%20weather%20conditions on Feb. 26, 2024, 6 pages.

Bourke, P., "Instructions for Creating Remap Filters for Ffmpeg from Fish2persp," Mar. 2021, retrieved from internet at https://paulbourke.net/dome/fish2/fish2perspffmpeg.pdf on Apr. 19, 2024, 4 pages.

Edulbehram, J., "Benefits And Challenges Of Omnidirectional Cameras In Video Surveillance Market," SecurityInformed.com, first publication date unknown [online], published at: https://www.securityinformed.com/insights/omnidirectional-cameras-video-surveillance-benefits-challenges-co-9385-ga-co-9294-ga.20448.html?utm_source=SSc on Feb. 26, 2024, 5 pages.

Odenthal, T., "How Artificial Intelligence is Influencing Video Production," Roboflow, Inc., published Jan. 4, 2023 at https://blog.roboflow.com/how-ai-is-influencing-video-production/, 9 pages.

Restless Creative, "How to Reframe 360 Video in the Insta360 App using Keyframes," uploaded on Mar. 4, 2023. Retrieved on Feb. 27, 2024, from https://www.youtube.com/watch?v=AzppfK1jy2k, PDF of Video Screenshot Provided, 14 pages.

International Search Report and Written Opinion for PCT Application No. PCT/US2025/024905, by Verkada Inc., mailed Aug. 8, 2025; 20 pages.

* cited by examiner

| Row | (Pan, Tilt, Zoom) | Timestamp (in seconds) |
|---|---|---|
| 1 | (0, 0, 0.1) | 5 |
| 2 | (0, 0, 0.2) | 5.1 |
| 3 | (0, 0, 0.3) | 5.2 |
| 4 | (0, 0.2, 0.3) | 5.3 |
| 5 | (0, 0.4, 0.3) | 5.4 |
| 6 | (-0.1, 0.4, 0.3) | 5.5 |
| 7 | (-0.25, 0.4, 0.3) | 5.6 |
| 8 | (-0.3, 0.45, 0.3) | 5.7 |

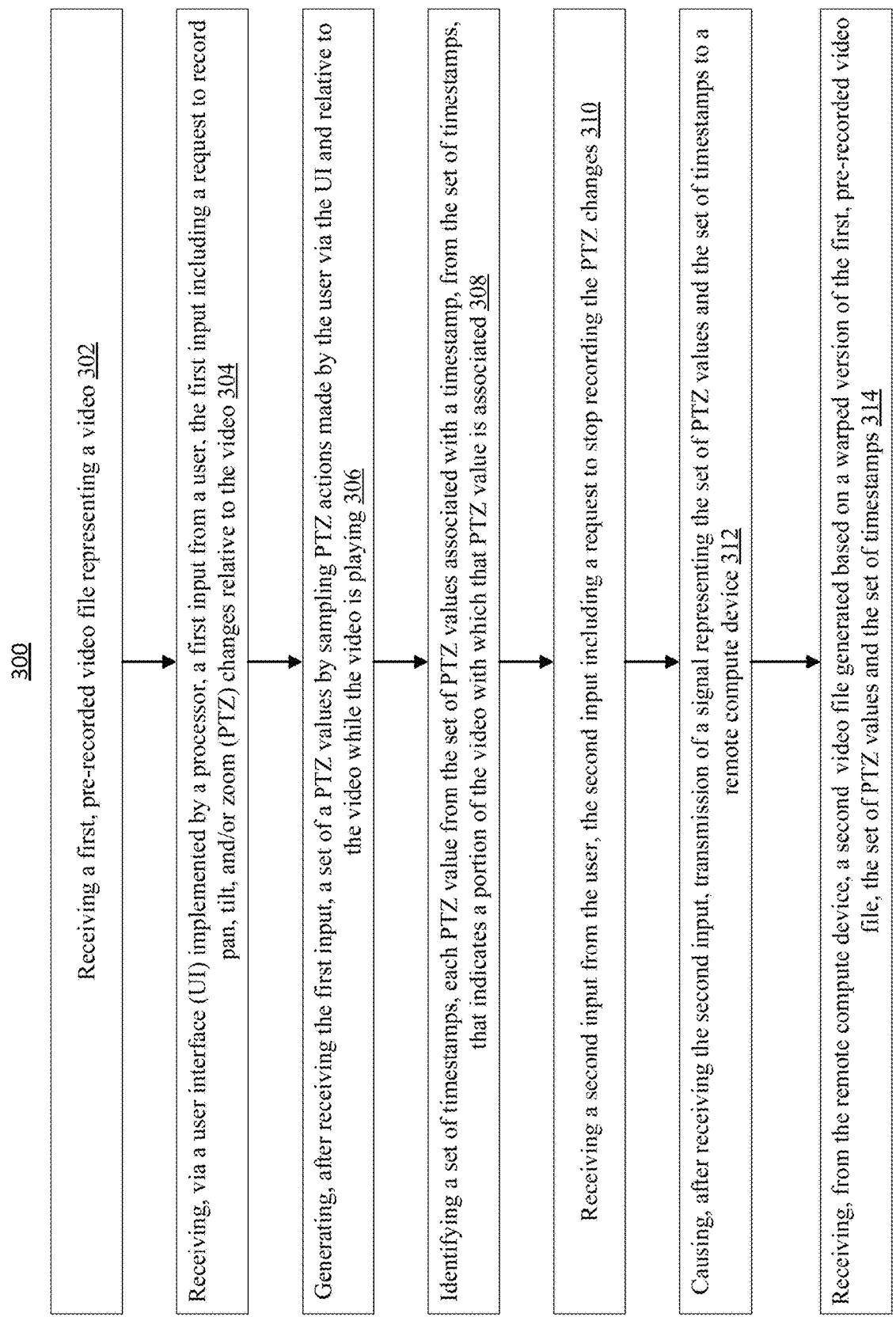

```
┌─────────────────────────────────┐
│ 400                             │
│ Receive, from a remote compute device associated with a user, a set of pan, tilt, and/or zoom (PTZ) values associated with a video
│ and a set of timestamps associated with the video, the set of PTZ values generated (1) after a first command from the user, received
│ at the remote compute device, to start recording PTZ changes, (2) before a second command from the user, received at the remote
│ compute device, to stop recording the PTZ changes, and (3) based on sampling PTZ actions taken (a) by the user via interaction with
│ a user interface (UI) of the remote compute device, relative to the video, (b) after the first command, and (c) before the second
│ command, each PTZ value from the set of PTZ values having an associated timestamp from the set of timestamps that indicates a
│ portion of the video from which that PTZ value was sampled 402
└─────────────────────────────────┘
                    │
                    ▼
┌─────────────────────────────────┐
│ Generate a modified video based on the set of PTZ values and the set of timestamps 404
└─────────────────────────────────┘
                    │
                    ▼
┌─────────────────────────────────┐
│ Send the modified video to the remote compute device 406
└─────────────────────────────────┘
```

FIG. 4

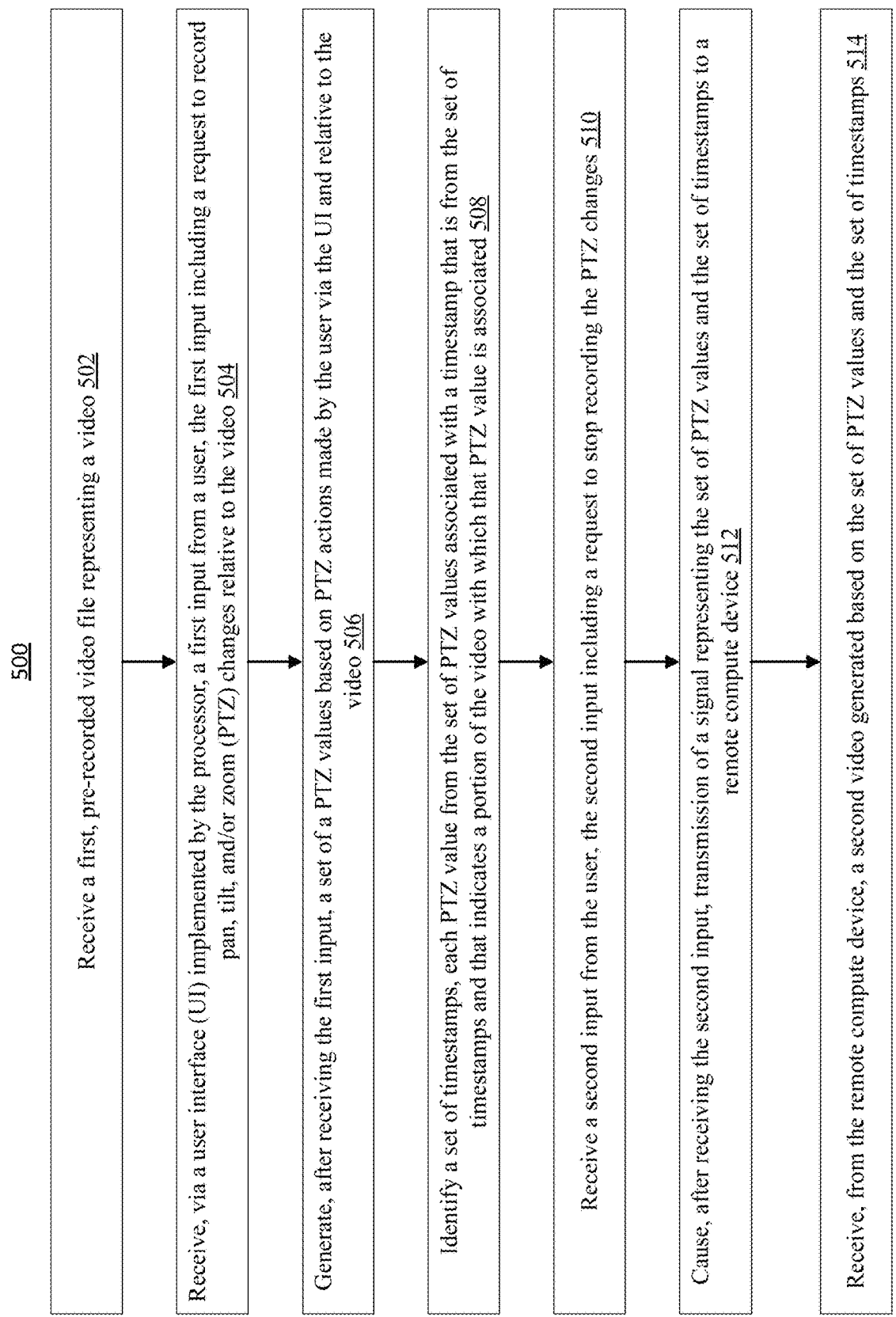

DE-WARPING PRE-RECORDED VIDEO AND TRACKING PAN, TILT, AND/OR ZOOM (PTZ) CHANGES TO GENERATE A PTZ-MODIFIED VIDEO

FIELD

One or more embodiments relate to de-warping pre-recorded video and tracking PTZ changes to generate a PTZ-modified video.

BACKGROUND

Fisheye lenses are ultra-wide angle lenses that generate distorted imagery having a convex, non-rectilinear appearance. The distortion in such imagery can be removed using a process called de-warping.

SUMMARY

In an embodiment, a first, pre-recorded video file representing a video is received. A first input is received, via a user interface (UI) implemented by a processor, from a user. The first input includes a request to record pan, tilt, and/or zoom (PTZ) changes relative to the video. After receiving the first input, a set of PTZ values is generated by sampling PTZ actions made by the user via the UI and relative to the video while the video is playing. A set of timestamps is identified. Each PTZ value from the set of PTZ values is associated with a timestamp, from the set of timestamps, that indicates a portion of the video with which that PTZ value is associated. A second input is received from the user. The second input includes a request to stop recording the PTZ changes. A signal representing the set of PTZ values and the associated set of timestamps is caused to be transmitted to a remote compute device. A second video file generated based on a warped version of the first, pre-recorded video file, the set of PTZ values and the associated set of timestamps is received from the remote compute device.

In an embodiment, a set of PTZ values associated with a video and a set of timestamps associated with the video are received from a remote compute device associated with a user (e.g., user U). The set of PTZ values are generated (1) after a first command from the user, received at the remote compute device, to start recording PTZ changes, (2) before a second command from the user, received at the remote compute device, to stop recording the PTZ changes, and (3) based on sampling PTZ actions taken (a) by the user via interaction with a user interface of the remote compute device, relative to the video, (b) after the first command, and (c) before the second command. Each PTZ value from the set of PTZ values has an associated timestamp from the set of timestamps that indicates a portion of the video from which that PTZ value was sampled and/or a portion of the video with which that PTZ value coincided. A modified video is generated based on the set of PTZ values and the set of timestamps. The modified video is sent to the remote compute device.

In an embodiment, a first, pre-recorded video file representing a video is received. A first input is received from a user via a UI implemented by a processor. The first input includes a request to record pan, tilt, and/or zoom (PTZ) changes relative to the video. A set of PTZ values is generated based on PTZ actions made by the user via the UI and relative to the video. A set of timestamps is identified. Each PTZ value from the set of PTZ values is associated with a timestamp that is from the set of timestamps and that indicates a portion of the video with which that PTZ value is associated. A second input is received from the user. The second input includes a request to stop recording the PTZ changes. A signal representing the set of PTZ values and the associated set of timestamps is caused, after receiving the second input, to be transmitted to a remote compute device. A second video generated based on the set of PTZ values and the associated set of timestamps is received from the remote compute device.

BRIEF DESCRIPTION OF THE DRAWINGS

FIG. 2 illustrates an example of a table with PTZ values and timestamps, according to an embodiment.

FIG. 3 shows a flowchart of a method for a user compute device to capture PTZ values and receive a PTZ-modified video generated based on the PTZ values, according to an embodiment.

FIG. 4 shows a flowchart of a method for a compute device to generate a PTZ-modified video, according to an embodiment.

FIG. 5 shows a flowchart of a method to capture PTZ values and receive a PTZ-modified video generated based on the PTZ values, according to an embodiment.

DETAILED DESCRIPTION

Some cameras (e.g., "fixed cameras") cannot mechanically pan, tilt, and/or zoom. Video recorded by such cameras thus has a single, static point of view/perspective. It may in some instances be desirable to modify video recorded by fixed cameras to incorporate pan, tilt, and/or zoom modifications (e.g., digitally modify the video as if the camera that captured the video was panning, tilting, and/or zooming), such that the modified video reflects, for example, the tracking of an object or event of interest. One or more embodiments of the present disclosure are related to tracking pan, tilt, and/or zoom (PTZ) changes made to a pre-recorded video, and generating a PTZ video (sometimes referred to herein as a "PZT-modified video") incorporating those PTZ changes at the pre-recorded video. In some implementations, videos captured by a fisheye camera ("pre-recorded videos") are de-warped, and a user(s) can record and apply custom PTZ poses to the pre-recorded videos. The fisheye camera can be mounted indoors or outdoors and on, for example, a wall, ceiling, pole, and/or the like. The fisheye camera can be mounted so that the fisheye camera's field of view captures an area of interest, such as a sidewalk, entrance, room, aisle, and/or the like. The fisheye camera can be mounted as to avoid overhangs or obstructions that may reflect the fisheye camera's illumination and reduce clarity. In some implementations, the fisheye camera is 8 to 10 feet above the ground. In some implementations, techniques described herein let users follow around persons of interest (POIs) and/or track suspicious activity as an alternative, for example, to creating multiple separate pre-recorded videos each having a different associated (static) point of view.

In some implementations, "pan" means to rotate horizontally, optionally while maintaining a fixed vertical position. For example, panning could be similar to the motion of moving the head left or right. In some implementations, "tilt" means to rotate vertically up or down, optionally while maintaining a fixed horizontal position. For example, tilting could be similar to the motion of moving the head up or down.

Figure 6:
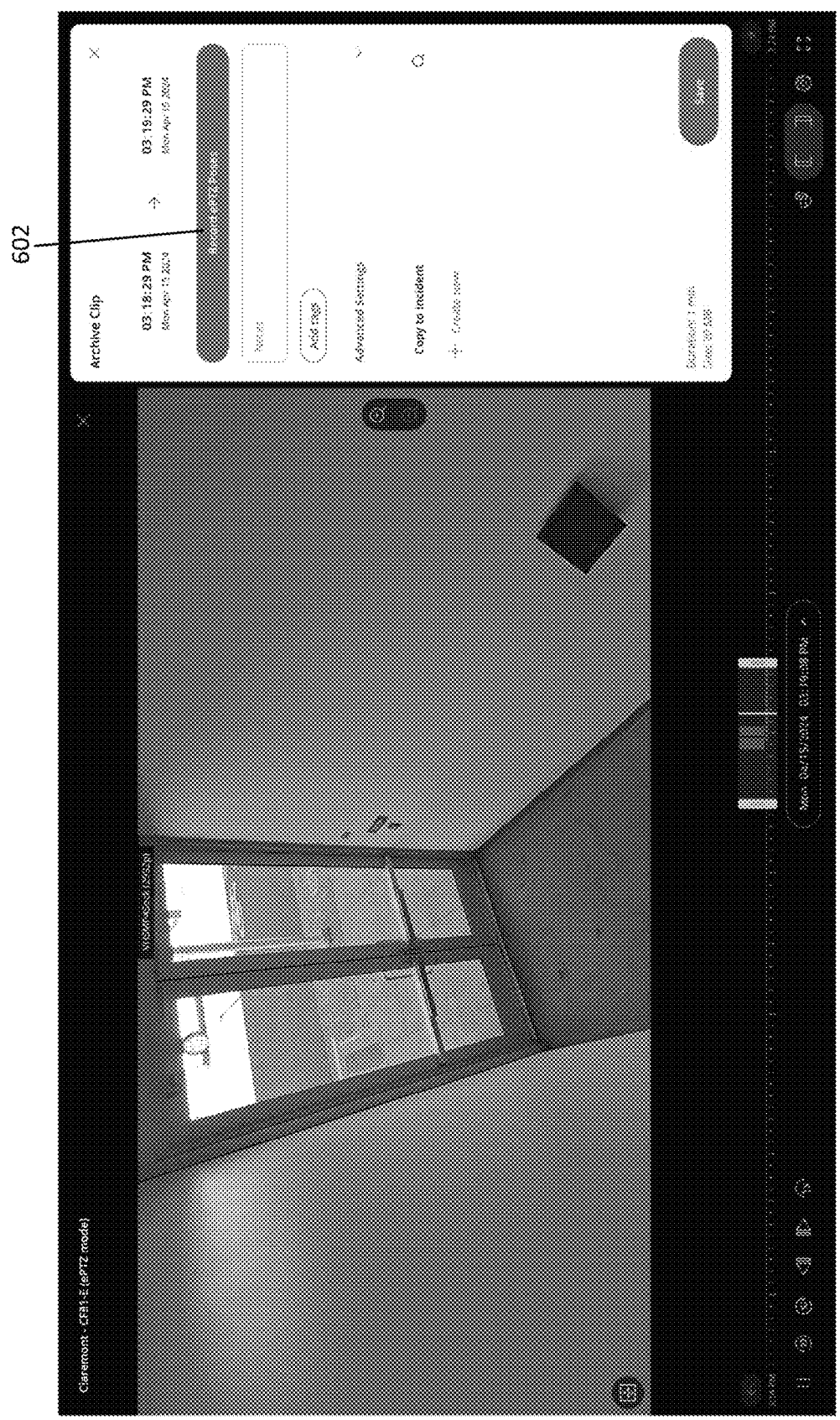
FIG. 6 shows an example of a video player interface, according to an embodiment.

In some implementations, a user is provided with a video player (e.g., a software-implemented video player that can be displayed to the user via a user interface; an example of a video player interface is shown at FIG. 6), which displays a de-warped version of a pre-recorded fisheye video. The user can select (e.g., by clicking on) an option within the video player, such as a "record" button, to pan, tilt, and/or zoom within the de-warped video as the de-warped video plays. For example, the user can move (e.g., via the video player) diagonally within the de-warped video, where the vertical and horizontal movements are captured as separate tilt and pan values, respectively. As another example, the user can zoom in and move (e.g., via the video player) diagonally within the de-warped video, where the zoom, vertical, and horizontal movements are captured as separate zoom, tilt, and pan values, respectively. As the user is making PTZ changes (e.g., panning, tilting, and/or zooming, whether in connection with orthogonal or non-orthogonal (e.g., diagonal) movements), the timestamp and PTZ values of each pose change that the user makes are debounced and then recorded into a data structure, such as an array, on a frontend (e.g., at the user's compute device). As used herein, "debouncing" can refer, for example, to delaying calling a function until after a set duration of time has passed since the last time the same function was called and/or to ensuring that a portion of code is only triggered once per associated input. After the recording is completed, the user may submit a request to save and/or store the PTZ-modified video, in which case the recorded values may be exported to an endpoint compute device (e.g., a backend) along with other archive setting values. On the export endpoint/backend, in some implementations, a video and/or audio processing software (e.g., ffMPEG™ 'trim') can be used to snip the footage into snippets for each pose/PTZ value. Then, for every pose/PTZ value, 'remapping' is performed by applying pixel-to-pixel transformations that mirror the frontend de-warping logic used to generate the de-warped version of the recorded fisheye video (e.g., based on Three.js™). Then in some implementations, the backend can archive (e.g., export historical video, save a video, etc.) with the aforementioned modifications and export the PTZ-modified video to the frontend.

Figure 1:
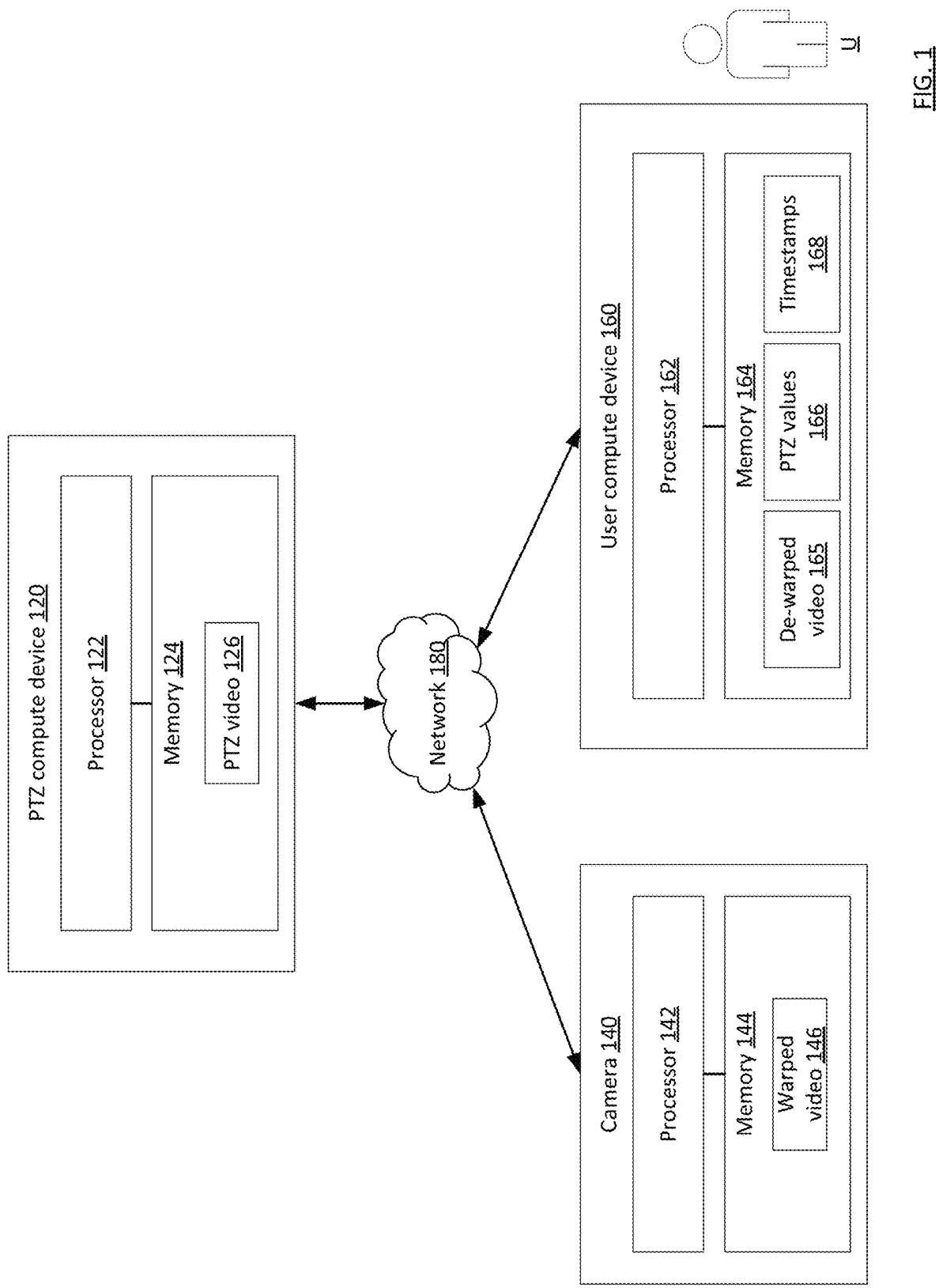
FIG. 1 shows a system to capture a video, capture PTZ changes at the video, and generate a PTZ-modified video based on the PTZ changes, according to an embodiment.

FIG. 1 shows a system to capture a video, capture PTZ changes relative to the video, and generate a PTZ-modified video incorporating the PTZ changes, according to an embodiment. FIG. 1 includes PTZ compute device(s) 120, camera(s) 140, and user compute device(s) 160, each communicatively coupled to one another via network 180.

Network 180 can be any suitable communications network for transferring data, for example, operating over public and/or private communications networks. For example, network 180 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, network 180 can be a wireless network such as, for example, a Wi-Fi® or wireless local area network ("WLAN"), a wireless wide area network ("WWAN"), and/or a cellular network. In other instances, the network 180 can be a wired network such as, for example, an Ethernet network, a digital subscription line ("DSL") network, a broadband network, and/or a fiber-optic network. In some instances, network 180 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via network 180 can be encrypted or unencrypted. In some instances, the network 180 can include multiple networks or subnetworks operatively coupled to one another by, for example, network bridges, routers, switches, gateways and/or the like.

PTZ compute device 120 can be any type of compute device, such as a server, desktop, laptop, tablet, mobile device, and/or the like. PTZ compute device 120 includes a processor 122 communicatively coupled to a memory 124 (e.g., via a system bus). PTZ compute device 120 can generate a PTZ-modified video based on an original video, PTZ values, and timestamps.

User compute device 160 can be any type of compute device, such as a server, desktop, laptop, tablet, mobile device, and/or the like. User compute device 160 includes a processor 162 communicatively coupled to a memory 164 (e.g., via a system bus). User compute device 160 can capture PTZ values and timestamps that are then sent to PTZ compute device 120 for generating a PTZ-modified video.

Camera 140 can be any type of camera, such as a dome camera, bullet camera, fisheye camera, internet protocol (IP) camera, 4K camera, pan-tilt-zoom (PTZ) camera, Wi-Fi camera, license plate recognition (LPR) camera, and/or the like. Camera 140 includes a processor 142 communicatively coupled to a memory 144 (e.g., via a system bus). In some implementations, camera 140 is not configured to (or is configured to not) mechanically pan, tilt, and/or zoom (at least not substantially or on command); for example, camera 140 is not a PTZ camera. In other implementations, camera 140 is configured to mechanically pan, tilt, and/or zoom. In some implementations, camera 140 is an electronic pan, tilt, and zoom (ePTZ) camera; ePTZ can refer to digitally providing PTZ-like features on a fixed (non-PTZ) camera.

PTZ compute device 120, camera 140, and user compute device 160 can each be remote to one another. Thus, PTZ compute device 120, camera 140, and user compute device 160 can each be separate devices that are at different locations but can communicate (e.g., send and receive data) with each other via network 180. For example, camera 140 can be located at a first building while PTZ compute device 120 is located in a first room of a second building and user compute device 160 is located in a second room of the second building. As another example, camera 140, PTZ compute device 120, and user compute device 160 can all be in the same room and/or building, but separate devices that can communicate with each other via network 180.

Processor 122, 142, and/or 162 each can be, for example, a hardware-based integrated circuit (IC) or any other suitable processing device configured to run and/or execute a set of instructions or code. For example, processor 122, 142, and/or 162 each can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, processor 122, 142, and/or 162 can be configured to run any of the methods and/or portions of methods discussed herein.

Memory 124, 144, and/or 164 each can be, for example, a random-access memory (RAM), a memory buffer, a hard drive, a read-only memory (ROM), an erasable programmable read-only memory (EPROM), and/or the like. Memory 124, 144, and/or 164 can be configured to store any data used by processor 122, 142, and/or 162, respectively, to perform the techniques (methods, processes, etc.) discussed herein. In some instances, memory 124, 144, and/or 164 can store, for example, one or more software programs and/or code that can include instructions to cause processor 122, 142, and/or 162, respectively, to perform one or more processes, functions, and/or the like. In some implementations, memory 124, 144, and/or 164 can include extendible storage units that can be added and used incrementally. In some implementations, memory 124, 144, and/or 164 each can be a portable memory (for example, a flash drive, a portable hard disk, a SD card, and/or the like) that can be operatively coupled to processor 122, 142, and/or 162, respectively. In some instances, memory 124, 144, and/or 164 can be remotely operatively coupled with a compute device (not shown in FIG. 1). In some instances, memory 124, 144, and/or 164 is a virtual storage drive (e.g., RAMDisk), which can improve I/O speed and in turn, accelerate image reading and writing.

Memory 144 includes (e.g., stores) warped video 146. Warped video 146 can be a video file representing light from any captured/recorded scene. In some implementations, camera 140 is a fisheye camera (e.g., a camera that includes a fisheye lens) configured to capture warped video 146. Thus, the warped video 146 can be generated by the camera 140. In some implementations, video 146 is pre-recorded (e.g., not a livestream).

In some implementations, warped video 146 includes video having a wide-angle warping video effect (e.g., barrel distortion, pincushion distortion, mustache distortion, etc.). In some implementations, instead of producing images or video with straight lines of perspective (e.g., rectilinear images or video), a fisheye lens can use a predetermined mapping (e.g., distortion, equisolid angle), which gives images or video a characteristic convex non-rectilinear appearance.

User U can interact with user compute device 160 (e.g., via a graphical user interface (GUI) thereof) to request warped video 146 and/or de-warped video 165. For example, user U can navigate to a website using user compute device 160, log into a user account having permission to request videos captured by camera 140, and request warped video 146/de-warped video 165 while logged in at the user account. In response to user compute device 160 receiving an indication to request warped video 146/de-warped video 165 from user U, user compute device 160 can send an electronic signal to camera 140 and/or to PTZ compute device 120 via network 180, to request the warped video 146/de-warped video 165.

In some implementations, in response to user compute device 160 sending the electronic signal to camera 140 and/or to PTZ compute device 120 requesting the warped video 146, warped video 146 may be de-warped to produce de-warped video 165. Warped video 146 can be de-warped to generate de-warped video 165 at camera 140, PTZ compute device 120, user compute device 160, and/or an additional compute device and/or electronic device not shown in FIG. 1. For example, in some implementations, warped video 146 may be sent from camera 140 to PTZ compute device 120, and PTZ compute device 120 may de-warp the warped video 146 to generate de-warped video 165, and send the de-warped video 165 to user compute device 160. As another example, in some implementations, warped video 146 is sent to user compute device 160 (e.g., via PTZ compute device 120 or without PTZ compute device 120 storing/receiving warped video 146), and user compute device 160 may de-warp the warped video 146 to generate the de-warped video 165.

In response to receiving de-warped video 165, user compute device 160 can play the de-warped video 165. De-warped video 165 can be played at, for example, a browser or native application at user compute device 160. Although not shown in FIG. 1, de-warped video 165 can be displayed via a display included in user compute device 160 and, if present, audio of de-warped video 165 can be output via a speaker included in user compute device 160.

In some implementations, user compute device 160 can record PTZ changes made to de-warped video 165 at user compute device 160 by user U. Said differently, techniques described herein enable user U to, while de-warped video 165 is playing at user compute device 160, make and record PTZ changes made to de-warped video 165 while de-warped video 165 is playing so that a PTZ-modified version of de-warped video 165/warped video 146 is generated. For example, if de-warped video 165 is of a scene with multiple people and user U zooms in on a particular person while de-warped video 165 is playing, a modified version of de-warped video 165 can be created that captures user U's action of zooming in on that particular person. In some implementations, de-warping includes applying a two-dimensional circle video into a virtual three-dimensional semi-sphere (e.g., those calculations being performed by PTZ compute device 120 using ffMPEG™ and/or user compute device 160 using Three.js™). Additional details related to electronically/digitally panning, tilting, and zooming a video captured by a camera that does not mechanically pan, tilt, or zoom (e.g., a fisheye camera) is discussed at Bourke, Paul, "Instructions for Creating Remap Filters for Ffmpeg from Fish2persp." Paul Bourke, March 2021, paulbourke.net/dome/fish2/fish2perspffmpeg.pdf. and U.S. Patent No. Re. 36,207, titled "OMNIVIEW MOTIONLESS CAMERA ORIENTATION SYSTEM" and filed Jul. 12, 1996, the contents of each of which are incorporated by reference herein in their entirety.

In some implementations, while de-warped video 165 is playing at user compute device 160, user compute device 160 receives an indication/command to begin recording PTZ changes at de-warped video 165. For example, in some implementations, de-warped video 165 is played at user compute device 160 via a user interface (UI) at user compute device 160. User U can provide an indication via the UI (e.g., select record button, input a record command, etc.) to begin recording PTZ changes. User U can provide the indication to begin recording PTZ changes before de-warped video 165 begins playing (e.g., user U can indicate ahead of time to start recording PTZ changes one minute into de-warped video 165), the moment de-warped video 165 begins playing, or after de-warped video 165 begins playing (e.g., user U can indicate to start recording PTZ changes at the 20 second mark of de-warped video 165). As another example, in some implementations, de-warped video 165 begins recording PTZ changes without receiving an indication from user U to start recording PTZ changes (e.g., PTZ changes start recording once de-warped video 165 begins playing).

In response to receiving an indication to begin recording PTZ changes at de-warped video 165, user compute device 160 can capture PTZ changes made at de-warped video 165 via user U. For example, while de-warped video 165 is playing, user U may pan, tilt, and/or zoom using their fingers (e.g., pinch, swipe, etc.) and/or a peripheral device included in user compute device 160 (e.g., click using a mouse, type using a keyboard, etc.). These PTZ changes can be sampled to generate PTZ values 166. Additionally, an indication of when these PTZ changes were made at de-warped video 165 can be tracked to generate timestamps 168. In some implementations, each timestamp from timestamps 168 includes and/or has an associated start time and end time per PTZ pose recorded, such that that specific PTZ pose persists throughout the timeframe defined by those start and end times. For example, a start time can be captured when a first PTZ pose change is made and the end time for the first PTZ pose can represent when that first PTZ pose is changed to a second PTZ pose. In some implementations, each timestamp from timestamps 168 has a start time per PTZ pose recorded (e.g., but not an end time).

PTZ values 166 (sometimes referred to herein as a "set of PTZ values") represent at least a portion of the PTZ changes made at de-warped video 165 by user U. For example, if PTZ changes represent all PTZ changes made at de-warped video 165 by user U, PTZ values 166 can be a sampled subset (e.g., every eight PTZ changes). Each PTZ value from PTZ values 166 is associated with a timestamp from timestamps 168 (sometimes referred to herein as a "set of timestamps) indicating when/where at de-warped video 165 that PTZ value was captured. Said differently, each PTZ value from PTZ values 166 has an associated timestamp from timestamps 168 that indicates a portion of the de-warped video 165 from which that PTZ value was sampled and the time within/relative to the video playback that PTZ value was sampled.

An example of a table 200 with PTZ values and timestamps is shown in FIG. 2, according to an embodiment. In the example shown in FIG. 2, table 200 can represent PTZ values (e.g., PTZ values 166) and timestamps (e.g., timestamps 168) based on PTZ changes by a user (e.g., user U) that occurred between the 5 to 5.7 second mark of a de-warped video (e.g., de-warped video 165). At table 200, values in the (Pan, Tilt, Zoom) column can represent pose, tilt, and zoom values, respectively. In the example shown at table 200, a pose, tilt, or zoom value of 0 can represent a center/standard/default/any other predetermined reference, while a positive or negative value can represent a direction (e.g., negative value can represent one direction of pan, tilt, or zoom, and positive value can represent a different direction of pan, tilt, or zoom) and extent (e.g., the larger the absolute value, the greater the amount of pan, tilt, or zoom) of pan, tilt, or zoom. The timestamp column can indicate the point in time (e.g., relative to the start of the de-warped video) of the de-warped video that the (Pan, Tilt, Zoom) value in the corresponding row represents.

As shown at row 1 of table 200, at the 5 second mark of a de-warped video playing at a user's compute device, the user performed a zoom action (e.g., zoom in) but not a pan or tilt action, represented as (0, 0, 0.1). At the 5.1 second mark, as shown at row 2 of table 200, the user performed a further zoom action (e.g., zoom in more) but not a pan or tilt action, represented as (0, 0, 0.2). At the 5.2 second mark, as shown at row 3 of table 200, the user performed an even further zoom action (e.g., zoom in even more) but not a pan or tilt action, represented as (0, 0, 0.3). At the 5.3 second mark, as shown at row 4 of table 200, the user performed a tilt action (e.g., tilt up) but not a pan or zoom action, represented as (0, 0.2, 0.3). At the 5.4 second mark, as shown at row 5 of table 200, the user performed a further tilt action (e.g., tilt up more) but not a pan or zoom action, represented as (0, 0.4, 0.3). At the 5.5 second mark, as shown at row 6 of table 200, the user performed a pan action (e.g., pan left) but not a tilt or zoom action, represented as (−0.1, 0.4, 0.3). At the 5.6 second mark, as shown at row 7 of table 200, the user performed a further pan action (e.g., pan further left) but not a tilt or zoom action, represented as (−0.25, 0.4, 0.3). At the 5.7 second mark, as shown at row 8 of table 200, the user performed an even further pan action (e.g., pan even further left) and an additional tilt action (e.g., tilt even further up) but not a zoom action, represented as (−0.3, 0.45, 0.3).

Table 200 shows an example of PTZ values and timestamps for a PTZ change that occurred between the 5 and 5.7 second mark of a de-warped video, but additional PTZ and timestamp values can be collected at other parts of the de-warped video (e.g., at the 10-10.2 second mark, at the 12-14.2 second mark, etc.). Additional PTZ changes could have occurred between the 5 to 5.7 second mark, such as at the 5.05 or 5.06 second mark, but the PTZ values shown in table 200 can represent a sampled subset of all the PTZ changes that occurred between the 5 to 5.7 second mark.

Note that FIG. 2 is one example, and variations can exist. For example, the timestamps in FIG. 2 lists start times but not end times, but in other implementations, the timestamps can include both start and end times. For example, the timestamp for row 1 can be from 5-5.099 seconds, the timestamp for row 2 can be from 5.1-5.199 seconds, and so on. As another example, the PTZ values and timestamps could be that the PTZ value from the 15-17 second mark is (0, 0, 0.1), from the 17-30 second mark is (0, 0.1, 0.1), from the 30-30.5 second mark is (0, 0.1, 0.2), and so on.

In some implementations, PTZ values and timestamps are only sampled when (e.g., in response to when) PTZ changes occur at the de-warped video. Said differently, no PTZ values and timestamps are collected when PTZ changes are not being made by the user, which can limit the size of table 200 and thus save memory/reduce processing burden. In other implementations, however, PTZ values and timestamps can be collected even though PTZ changes are not being made (e.g., throughout the entire duration of the de-warped video).

Referring back to FIG. 1, PTZ values 166 and timestamps 168 can be collected until user compute device 160 receives an indication to stop recording PTZ changes at de-warped video 165. For example, in some implementations, user U can provide an indication via the UI (e.g., select stop record button, input a stop record command, etc.) to stop recording PTZ changes. The indication to stop recording PTZ changes can come from user U before de-warped video 165 has stopped playing. In some implementations, the indication to stop recording PTZ changes is not received from user U, but instead occurs (e.g., automatically) when de-warped video 165 is finished playing. For example, the UI of user compute device 160 may not receive a command from user U indicating to stop recording PTZ changes, and instead may stop (e.g., without user U input) recording PTZ changes when de-warped video 165 ends/stops playing.

PTZ values 166 and timestamps 168 represent when and what PTZ changes were made at de-warped video 165 between a first time—when user compute device 160 receives an indication to start recording PTZ changes—and a second time—when user compute device 160 receives an indication to stop recording PTZ changes. Thus, if de-warped video 165 is five minutes long, PTZ values 166 and timestamps 168 could represent five minutes worth of PTZ changes or less than five minutes worth of PTZ changes, depending on what portions of de-warped video 146 were recorded for PTZ changes.

Returning to FIG. 1, PTZ values 166 and timestamps 168 can be sent from user compute device 160 to PTZ compute device 120. PTZ compute device 120 can be configured to generate PTZ video 126. PTZ video 126 can be a version of warped video 146/de-warped video 165 that incorporates/reflects PTZ values 166 and timestamps 168. Said differently, PTZ video 126 can incorporate the recorded PTZ changes made by user U, as represented by PTZ values 166 and timestamps 168, at de-warped video 165. For example, if warped video 146/de-warped video 165 is a pre-recorded video of a scene, user U records PTZ changes made at the pre-recorded video, and those PTZ changes include user U zooming into a subpart of the scene at a particular point of the pre-recorded video, PTZ video 126 can also zoom in to the subpart of the scene at the same particular point of the pre-recorded video. Additionally or alternatively (e.g., without generating PTZ video 126), in some implementations, PTZ compute device 120 can store PTZ values 166 and/or de-warped video 165 in memory 124.

PTZ compute device 120 can generate PTZ video 126 based on PTZ values 166 and timestamps 168. In some implementations, generating PTZ video 126 includes, at each portion of a video (e.g., warped video 146 and/or de-warped video 165) associated with a timestamp from timestamps 168 having an associated PTZ value from PTZ values 166, replacing that portion (e.g., frame(s)) of the video with an updated video portion (e.g., frame(s)) that is generated based on the PTZ value from PTZ values 166 associated with the timestamp and, optionally (e.g., if a frame from warped video 146 is being used to generate the updated video portion), a pixel-by-pixel transformation technique that mirrors the de-warping technique used to de-warp warped video 146 and generated de-warped video 165. For example, if PTZ values and timestamps 168 indicate that (Pan, Tilt, Zoom) values at the 5.1 second mark of a video (e.g., warped video 146, de-warped video 165) are (0, 0, 0.2), the original frames at the 5.1 second mark of the video can be replaced with an updated frame that was generated based on the original frames at the 5.1 second mark, the (0, 0, 0.2) PTZ value, and optionally (e.g., if the original frames are from warped video 146) a de-warping technique that was used to de-warp warped video 146 and generate de-warped video 165.

PTZ video 126 can be warped or de-warped. If PTZ video 126 is warped, in some implementations, PTZ compute device 120 and/or user compute device 160 can de-warped PTZ video 126 (e.g., using the same technique used to de-warp warped video 146 and generate de-warped video 165).

In some implementations, in addition to sending PTZ values 166 and timestamps 168 from user compute device 160 to PTZ compute device 120 to generate PTZ videos 126, additional data can be sent to and stored at (e.g., at memory 124) PTZ compute device 120 for use in generating PTZ video 126, determining permissions (e.g., who can access) for PTZ video 126, classifying/archiving PTZ video 126 in a database, and/or the like. Examples of additional data that can be sent to PTZ compute device 120 from user compute device 160 includes a camera identifier indicating the camera that was used to capture warped video 146 (e.g., to log PTZ video 126 with camera 140 in a database for later access), a face blur setting (e.g., indicating whether any faces present in PTZ video 126 should be blurred), a share setting (e.g., indicating which user compute devices and/or user accounts can access PTZ video 126), start and end time of warped video 146/de-warped video 165, tags (e.g., provided by a user for de-warped video 165 via a video player interface), notes (e.g., provided by a user for de-warped video 165 via a video player interface), timestamp location (e.g., which corner of de-warped video 165 the timestamp should live in), and/or the like. In some implementations, the additional data can be received at PTZ compute device 120 and used as metadata for PTZ video 126.

In some implementations, camera 140 is a camera that is not able to (or at least substantially not able to) mechanically perform PTZ actions. For example, camera 140 is not configured to mechanically pan, tilt, or zoom. In some implementations, camera 140 is a camera that is able to mechanically perform PTZ actions, but such PTZ actions are limited (e.g., can't pan, tilt, and/or zoom as much as user U desires).

In some implementations, PTZ video 126 is saved at PTZ compute device 120 and/or a database at a different compute device. Thereafter, user compute device 160, user U's user account, and/or a different user (e.g., if granted permission) can access and view PTZ video 126.

In some implementations, any number of "record" and "stop record" events can occur while de-warped video 165 is playing. For example, for a five minute long video, user U can provide an indication to record PTZ changes at the one minute mark, stop recording PTZ changes at the two minute mark, record PTZ changes at the three minute mark, and stop recording PTZ changes at the four minute mark. In such a situation, in some implementations, the PTZ-modified video can include only the PTZ-changed video portions stitched together (e.g., continuing with the aforementioned example disclosed in this paragraph, the PTZ video only includes the PTZ changes tracked between the one and two minute mark and the three and four minute mark). Alternatively, in some implementations, the PTZ-modified video can include both the PTZ-changed video portions and video portions for which no PTZ changes were recorded (e.g., continuing with the aforementioned example disclosed in this paragraph, the PTZ video includes both (1) PTZ changes tracked between the one and two minute mark and the three and four minute mark and (2) video portions between the zero to one minute mark, two to three minute mark, and four to five minute mark).

Although FIG. 1 shows a single PTZ video being generated based on a single video captured by a single camera, in other implementations, any number of PTZ videos can be generated based on any number of videos. For example, camera 140 can capture an additional video that is used to generate an additional PTZ video based on PTZ changes made by user U at user compute device 160, user U at a different user compute device, a different user at user compute device 160, and/or a different user at a different user compute device. As another example, an additional camera different than camera 140 can capture an additional video that is used to generate an additional PTZ video based on PTZ changes made by user U at user compute device 160, user U at a different user compute device, a different user at user compute device 160, and/or a different user at a different user compute device.

Although some aspects of FIG. 1 were discussed in the context of a fisheye camera capturing a warped video and de-warping the video, in some implementations, a non-fisheye camera can be used to capture a video that does not need to be de-warped to create a modified video incorporating changes made by a user. For example, if a non-fisheye camera (e.g., with a rectilinear lens) is used to capture a non-warped video (e.g., video without distortion), and a user provides indication to record changes (e.g., move vertically without a rotational component (e.g., without tilting), move horizontally without a rotational component (e.g., without panning), and/or zoom) while the non-warped video is playing, the non-warped video does not need to be de-warped to generate modified video.

Although some aspects of FIG. 1 were discussed in the context of a fisheye camera capturing a warped video and de-warping the video, in some implementations, a camera different than a fisheye camera and configured to capture depth information can be used to capture a warped video that is de-warped and used to create a PTZ video. The camera can include, for example, a lens having barrel distortion, pincushion distortion, mustache distortion, and/or the like.

Although FIG. 1 shows a single PTZ compute device, single camera, and single user compute device, in other implementations, any number of PTZ compute devices, cameras, and user compute devices can be used. For example, multiple compute devices can be used to perform functions of PTZ compute device 120 (e.g., one compute device de-warps and another generates PTZ videos).

FIG. 3 shows a flowchart of a method for a user compute device to capture PTZ values and receive a PTZ-modified video generated based on the PTZ values, according to an embodiment. In some implementations, method 300 is performed by a processor (e.g., processor 162).

At 302, a first, pre-recorded video file (e.g., de-warped video 165, a non-warped video) representing a video is received. For example, user compute device 160 can receive de-warped video 165. At 304, a first input is received, via a UI implemented by a processor (e.g., processor 142), from a user (e.g., user U). The first input includes a request to record pan, tilt, and/or zoom (PTZ) changes relative to the video. At 306, after receiving the first input at 304, a set of PTZ values (e.g., PTZ values 166) is generated by sampling PTZ actions made by the user via the UI and relative to the video while the video is playing. Any sampling rate can be used, such as capturing every eight PTZ changes instead of every PTZ change, which can save memory and reduce processing burden. In some implementations, 306 occurs automatically in response to completing 304. In some implementations, 306 occurs in response to the PTZ actions being made by the user.

At 308, a set of timestamps is identified (e.g., timestamps 168). Each PTZ value from the set of PTZ values is associated with a timestamp, from the set of timestamps, that indicates a portion of the video with which that PTZ value is associated. In some implementations, 308 occurs automatically in response to completing 304 and/or 306. In some implementations, 308 occurs in parallel with 306. In some implementations, 308 occurs in response to the PTZ actions being made by the user. At 310, a second input is received from the user. The second input includes a request to stop recording the PTZ changes. At 312, a signal representing the set of PTZ values and the set of timestamps is caused to be transmitted to a remote compute device (e.g., PTZ compute device 120). For example, user compute device 160 can send an electronic signal including a representation of the set of PTZ values and the set of timestamps to PTZ compute device 120. At 314, a second video file (e.g., PTZ video 126) generated based on a warped version of the first, pre-recorded video file (e.g., warped video 146), the set of PTZ values and the set of timestamps is received from the remote compute device.

Some implementations of method 300 further include receiving, from the remote compute device, the warped version of the first, pre-recorded video file. Some implementations of method 300 further include de-warping the warped version of the first, pre-recorded video file to generate the first, pre-recorded video file.

In some implementations of method 300, the first, pre-recorded video file is a de-warped video file received from the remote compute device. For example, the remote compute device can de-warp the warped version of the first, pre-recorded video file to generate the first, pre-recorded video file, and send the first, pre-recorded video file to user computer device 160.

In some implementations of method 300, the first, pre-recorded video file is a video file that was recorded using a fisheye camera (e.g., camera 140).

In some implementations of method 300, the video represented by the first, pre-recorded video file includes video recorded by a camera (e.g., camera 140). The camera can be associated with a camera identifier, and method 300 can further include sending, to the remote compute device, a representation of the camera identifier.

Some implementations of method 300 further include sending, to the remote compute device, a representation of a face blur. Alternatively or in addition, some implementations of method 300 further include sending, to the remote compute device, a representation of a sharing setting.

In some implementations of method 300, the PTZ actions are first PTZ actions and method 300 further includes receiving, at least one of (1) before receiving the request to record the PTZ changes or (2) after receiving the request to stop recording the PTZ changes, a representation of second PTZ actions made by the user via the UI and relative to the video while the video is playing. Some implementations of method 300 further include refraining from generating a second set of PTZ values based on the second PTZ actions.

In some implementations of method 300, the first, pre-recorded video file is a video file that was recorded using a camera (e.g., camera 140) that is not a fisheye camera. Alternatively or in addition, in some implementations of method 300, the first, pre-recorded video file is a video file that was recorded using a camera (e.g., camera 140) that is not configured to mechanically perform substantial PTZ pose changes, or that is not configured to mechanically pan, tilt and/or zoom. Such a camera, for example, may be unable to mechanically modify a pan, tilt and/or zoom value thereof by more than 1%, or by more than 2%, or by more than 5%, or by more than 10%, or by more than 25%, or by more than 33%, or by more than 50%, etc., and such movement may, for example, be incidental (e.g., due to wind or other extrinsic factors).

FIG. 4 shows a flowchart of a method 400 for a compute device to generate a PTZ-modified video, according to an embodiment. In some implementations, method 400 is performed by a processor (e.g., processor 122).

At 402, a set of PTZ values (e.g., PTZ values 166) associated with a video (e.g., de-warped video 165 and/or warped video 146) and a set of timestamps (e.g., timestamps 168) associated with the video are received from a remote compute device (e.g., user compute device 160) associated with a user (e.g., user U). The set of PTZ values are generated (1) after a first command from the user, received at the remote compute device, to start recording PTZ changes, (2) before a second command from the user, received at the remote compute device, to stop recording the PTZ changes, and (3) based on sampling PTZ actions taken (a) by the user via interaction with a user interface (UI) of the remote compute device, relative to the video, (b) after the first command, and (c) before the second command. Each PTZ value from the set of PTZ values has an associated timestamp from the set of timestamps that indicates a portion of the video from which that PTZ value was sampled.

At 404, a modified video (e.g., PTZ video 126) is generated based on the set of PTZ values and the set of timestamps. In some implementations, 404 occurs automatically (e.g., without human intervention) in response to completing 402. At 406, the modified video is sent to the remote compute device. In some implementations, 406 occurs automatically (e.g., without human intervention) in response to completing 404.

Some implementations of method 400 further include receiving a warped video file (e.g., warped video 146; from camera 140). Some implementations of method 400 further include de-warping the warped video file to generate a de-warped video file that includes the video. Some implementations of method 400 further include sending the de-warped video file to the remote compute device.

Some implementations of method 400 further include sending a warped video file (e.g., warped video 146) to the remote compute device for de-warping to generate the video.

In some implementations of method 400, the video is a video that was recorded using a fisheye camera (e.g., camera 140).

In some implementations of method 400, the video includes video that was de-warped using a de-warping technique. In some implementations of method 400, generating the modified video at 404 includes, at each portion of the video associated with a timestamp from the set of timestamps: generating an updated video portion based at least on a PTZ value from the set of PTZ values associated with the timestamp, that portion of the video, and a pixel-by-pixel transformation technique that mirrors the de-warping technique; and replacing that portion of the video with the updated video portion.

In some implementations of method 400, the remote compute device is a first remote compute device, the user is a first user, the set of PTZ values is a first set of PTZ values, the set of timestamps is a first set of timestamps, the video is a first video, the PTZ actions are first PTZ actions, the modified video is a first modified video, and the PTZ changes are first PTZ changes. Some implementations of method 400 further include receiving, from a second remote compute device that is different than the first remote compute device and associated with a second user different from the first user, a second set of PTZ values associated with a second video different than the first video and a second set of timestamps associated with the second video. The second set of PTZ values are captured (1) after a third command from the second user, received at the second remote compute device, to start recording second PTZ changes (2) before a fourth command from the second user, received at the second remote compute device, to stop recording the second PTZ changes, and (3) based on sampling second PTZ actions taken (a) by the second user at the second remote compute device, (b) after the third command, and (c) before the fourth command. Each PTZ value from the second set of PTZ values has an associated timestamp from the second set of timestamps that indicates a portion of the video from which that PTZ value was sampled. Some implementations of method 300 further include generating a second modified video based on the second set of PTZ values and the second set of timestamps. Some implementations of method 400 further include sending the second modified video to the second remote compute device.

In some implementations of method 400, the set of PTZ values is a first set of PTZ values, the set of timestamps is a first set of timestamps, the video is a first video, the PTZ actions are first PTZ actions, the modified video is a first modified video, and the PTZ changes are first PTZ changes. Some implementations of method 400 further include receiving, from the remote compute device, a second set of PTZ values associated with a second video different from the first video and a second set of timestamps associated with the second video. The second set of PTZ values are captured (1) after a third command from the user, received at the remote compute device, to start recording second PTZ changes (2) before a fourth command from the user, received at the remote compute device, to stop recording the second PTZ changes, and (3) based on sampling second PTZ actions taken (a) by the user at the remote compute device, (b) after the third command, and (c) before the fourth command. Each PTZ value from the second set of PTZ values has an associated timestamp from the second set of timestamps that indicates a portion of the video from which that PTZ value was sampled. Some implementations of method 400 further include generating a second modified video based on the second set of PTZ values and the second set of timestamps. Some implementations of method 400 further include sending the second modified video to the remote compute device.

FIG. 5 shows a flowchart of a method 500 to capture PTZ values and receive a PTZ-modified video generated based on the PTZ values, according to an embodiment. In some implementations, method 500 is performed by a processor (e.g., processor 162).

At 502, a first, pre-recorded video file (e.g., de-warped video 165, warped video 146, or non-warped video) representing a video is received. At 504, a first input is received from a user via a UI implemented by a processor. The first input includes a request to record pan, tilt, and/or zoom (PTZ) changes relative to the video. At 506, a set of PTZ values (e.g., PTZ values 166) is generated based on PTZ actions made by the user via the UI and relative to the video. At 508, a set of timestamps (e.g., timestamps 168) is identified. Each PTZ value from the set of PTZ values is associated with a timestamp that is from the set of timestamps and that indicates a portion of the video with which that PTZ value is associated. At 510, a second input is received from the user. The second input includes a request to stop recording the PTZ changes. At 512, a signal representing the set of PTZ values and the set of timestamps is caused, after receiving the second input at 510, to be transmitted to a remote compute device (e.g., PTZ compute device 120). At 514, a second video (e.g., PTZ video 126) generated based on the set of PTZ values and the set of timestamps is received from the remote compute device.

In some implementations of method 500, the video is or includes a de-warped video. Alternatively or in addition, in some implementations of method 500, the video is or includes a warped video. Alternatively or in addition, in some implementations of method 500, the video is or includes a non-warped video.

In some implementations of method 500, the first, pre-recorded video file is a video file that was recorded using a fisheye camera.

FIG. 6 shows an example of a video player interface, according to an embodiment. FIG. 6 illustrates an archive clip that was previously captured (e.g., not a livestream), specifically from Monday Apr. 15, 2024 at 03:18:29 PM to Monday Apr. 15, 2024 at 03:19:29 PM (e.g., by camera 140). The archive clip can be, for example, a de-warped video. The archive clip can be played at, for example, a browser and/or native application of user compute device 160. If the user wants to begin recording PTZ changes at the archive video, the user can select the Record ePTZ Poses button 602; thereafter and before the user selects a button to stop recording ePTZ poses, any PTZ changes the user makes at the archive video using their compute device can be tracked/recorded and used to generate a PTZ-modified version of the archive video. The video player interface can also receive additional data from a user, such as notes, tags, and/or the like, which can be sent from user compute device 160 to PTZ compute device 120 for consideration while generating, storing, and/or exporting a PTZ-modified version of the archive video.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:
   receiving, at a processor, a first, pre-recorded video file representing a video;
   receiving, via a user interface (UI) implemented by the processor, a first input from a user, the first input including a request to record pan, tilt, and/or zoom (PTZ) changes relative to the video;
   generating, via the processor and after receiving the first input, a set of a PTZ values by sampling PTZ actions made by the user via the UI and relative to the video while the video is playing;
   identifying, via the processor, a set of timestamps, each PTZ value from the set of PTZ values associated with a timestamp, from the set of timestamps, that indicates a portion of the video with which that PTZ value is associated;
   receiving, via the processor, a second input from the user, the second input including a request to stop recording the PTZ changes;
   causing, via the processor and after receiving the second input, transmission of a signal representing the set of PTZ values and the set of timestamps to a remote compute device; and
   receiving, at the processor and from the remote compute device, a second video file generated based on a warped version of the first, pre-recorded video file, the set of PTZ values and the set of timestamps.

2. The method of claim 1, further comprising:
   receiving, via the processor and from the remote compute device, the warped version of the first, pre-recorded video file; and
   de-warping the warped version of the first, pre-recorded video file to generate the first, pre-recorded video file.

3. The method of claim 1, wherein the first, pre-recorded video file is a de-warped video file received from the remote compute device.

4. The method of claim 1, wherein the first, pre-recorded video file is a video file that was recorded using a fisheye camera.

5. The method of claim 1, wherein the video represented by the first, pre-recorded video file includes video recorded by a camera and the camera is associated with a camera identifier, the method further comprising:
   sending, via the processor and to the remote compute device, a representation of the camera identifier.

6. The method of claim 1, further comprising:
   sending, via the processor and to the remote compute device, a representation of a face blur.

7. The method of claim 1, further comprising:
   sending, via the processor and to the remote compute device, a representation of a sharing setting.

8. The method of claim 1, wherein the PTZ actions are first PTZ actions and the method further comprises:
   receiving, via the processor and at least one of (1) before receiving the request to record the PTZ changes or (2) after receiving the request to stop recording the PTZ changes, a representation of second PTZ actions made by the user via the UI and relative to the video while the video is playing; and
   refraining, via the processor, from generating a second set of PTZ values based on the second PTZ actions.

9. The method of claim 1, wherein the first, pre-recorded video file is a video file that was recorded using a camera that is not a fisheye camera.

10. The method of claim 1, wherein the first, pre-recorded video file is a video file that was recorded using a camera that is not configured to mechanically perform substantial PTZ pose changes.

11. An apparatus, comprising:
a memory; and
a processor operatively coupled to the memory, the processor configured to:
receive, from a remote compute device associated with a user, a set of pan, tilt, and/or zoom (PTZ) values associated with a video and a set of timestamps associated with the video, the set of PTZ values generated (1) after a first command from the user, received at the remote compute device, to start recording PTZ changes, (2) before a second command from the user, received at the remote compute device, to stop recording the PTZ changes, and (3) based on sampling PTZ actions taken (a) by the user via interaction with a user interface (UI) of the remote compute device, relative to the video, (b) after the first command, and (c) before the second command, each PTZ value from the set of PTZ values having an associated timestamp from the set of timestamps that indicates a portion of the video from which that PTZ value was sampled;
generate a modified video based on the set of PTZ values and the set of timestamps; and
send the modified video to the remote compute device.

12. The apparatus of claim 11, wherein the processor is further configured to:
receive a warped video file;
de-warp the warped video file to generate a de-warped video file that includes the video, and
send the de-warped video file to the remote compute device.

13. The apparatus of claim 11, wherein the processor is further configured to:
send a warped video file to the remote compute device for de-warping to generate the video.

14. The apparatus of claim 11, wherein the video is a video that was recorded using a fisheye camera.

15. The apparatus of claim 11, wherein the video includes video that was de-warped using a de-warping technique, and the processor is further configured to generate the modified video include instructions to:
at each portion of the video associated with a timestamp from the set of timestamps: generate an updated video portion based at least on a PTZ value from the set of PTZ values associated with the timestamp, that portion of the video, and a pixel-by-pixel transformation technique that mirrors the de-warping technique; and
replace that portion of the video with the updated video portion.

16. The apparatus of claim 11, wherein the remote compute device is a first remote compute device, the user is a first user, the set of PTZ values is a first set of PTZ values, the set of timestamps is a first set of timestamps, the video is a first video, the PTZ actions are first PTZ actions, the modified video is a first modified video, the PTZ changes are first PTZ changes, and the processor is further configured to:
receive, from a second remote compute device that is different than the first remote compute device and associated with a second user different from the first user, a second set of PTZ values associated with a second video different than the first video and a second set of timestamps associated with the second video, the second set of PTZ values captured (1) after a third command from the second user, received at the second remote compute device, to start recording second PTZ changes (2) before a fourth command from the second user, received at the second remote compute device, to stop recording the second PTZ changes, and (3) based on sampling second PTZ actions taken (a) by the second user at the second remote compute device, (b) after the third command, and (c) before the fourth command, each PTZ value from the second set of PTZ values having an associated timestamp from the second set of timestamps that indicates a portion of the video from which that PTZ value was sampled;
generate a second modified video based on the second set of PTZ values and the second set of timestamps; and
send the second modified video to the second remote compute device.

17. The apparatus of claim 11, wherein the set of PTZ values is a first set of PTZ values, the set of timestamps is a first set of timestamps, the video is a first video, the PTZ actions are first PTZ actions, the modified video is a first modified video, the PTZ changes are first PTZ changes, and the processor is further configured to:
receive, from the remote compute device, a second set of PTZ values associated with a second video different from the first video and a second set of timestamps associated with the second video, the second set of PTZ values captured (1) after a third command from the user, received at the remote compute device, to start recording second PTZ changes (2) before a fourth command from the user, received at the remote compute device, to stop recording the second PTZ changes, and (3) based on sampling second PTZ actions taken (a) by the user at the remote compute device, (b) after the third command, and (c) before the fourth command, each PTZ value from the second set of PTZ values having an associated timestamp from the second set of timestamps that indicates a portion of the video from which that PTZ value was sampled;
generate a second modified video based on the second set of PTZ values and the second set of timestamps; and
send the second modified video to the remote compute device.

18. A non-transitory, processor-readable medium storing instructions that, when executed by a processor, cause the processor to:
receive a first, pre-recorded video file representing a video;
receive, via a user interface (UI) implemented by the processor, a first input from a user, the first input including a request to record pan, tilt, and/or zoom (PTZ) changes relative to the video;
generate, after receiving the first input, a set of a PTZ values based on PTZ actions made by the user via the UI and relative to the video;
identify a set of timestamps, each PTZ value from the set of PTZ values associated with a timestamp that is from the set of timestamps and that indicates a portion of the video with which that PTZ value is associated;
receive a second input from the user, the second input including a request to stop recording the PTZ changes;
cause, after receiving the second input, transmission of a signal representing the set of PTZ values and the set of timestamps to a remote compute device; and
receive, from the remote compute device, a second video generated based on the set of PTZ values and the set of timestamps.

19. The non-transitory, processor-readable medium of claim 18, wherein the video is a de-warped video.

20. The non-transitory, processor-readable medium of claim 18, wherein the first, pre-recorded video file is a video file that was recorded using a fisheye camera.

\* \* \* \* \*